(12) United States Patent
Fujii et al.

(10) Patent No.: US 9,440,608 B2
(45) Date of Patent: Sep. 13, 2016

(54) SEAT OCCUPANT DETERMINING APPARATUS

(71) Applicant: AISIN SEIKI KABUSHIKI KAISHA, Kariya-shi (JP)

(72) Inventors: Hiroyuki Fujii, Kariya (JP); Takahiro Izuno, Kariya (JP); Isao Honda, Anjo (JP); Yoshiaki Tomatsu, Kariya (JP); Yusuke Takahashi, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 219 days.

(21) Appl. No.: 13/799,166

(22) Filed: Mar. 13, 2013

(65) Prior Publication Data

US 2014/0266657 A1  Sep. 18, 2014

(51) Int. Cl.
*B60R 21/015* (2006.01)

(52) U.S. Cl.
CPC ......... *B60R 21/015* (2013.01); *B60R 21/0152* (2014.10)

(58) Field of Classification Search
CPC ............... B60R 21/01; B60R 21/015; B60R 21/01512; B60R 21/01516; B60R 21/0152; B60R 21/0142; B60R 21/01544; B60R 21/01546; B60R 21/01556; B60R 21/01566; B60R 21/0156; B60R 2021/01204; B60R 22/48; B60R 2202/4816; B60R 2202/4866; B60R 2022/4858
USPC ............ 340/438, 457, 457.1, 459, 500, 666, 340/667, 687; 180/271, 273; 324/207.13
See application file for complete search history.

(56) References Cited

U.S. PATENT DOCUMENTS

| | | | | |
|---|---|---|---|---|
| 6,397,136 | B1 * | 5/2002 | Breed | G01S 15/04 180/273 |
| 7,791,462 | B2 * | 9/2010 | Sakai | B60R 22/48 324/207.13 |
| 2005/0216158 | A1 * | 9/2005 | Sakai | B60N 2/002 701/45 |

FOREIGN PATENT DOCUMENTS

JP  9-207638  8/1997

OTHER PUBLICATIONS

U.S. Appl. No. 13/764,015, filed Feb. 11, 2013, Hiroyuki Fujii.

* cited by examiner

*Primary Examiner* — Brian Wilson
(74) *Attorney, Agent, or Firm* — Oblon, McClelland, Maier & Neustadt, L.L.P

(57) ABSTRACT

A seat passenger determination apparatus includes: a first determination processing unit configured to determine a passenger is not seated on a vehicle seat by having gotten out of the vehicle and transfer the mode to a not-seated recognition mode when a load variation width detected by a load detection apparatus falls within a first threshold value in a state in which a non-fastened state of a seatbelt is detected; and a second determination processing unit configured to determine the passenger is not seated on the vehicle seat by having gotten out of the vehicle and transfer the mode to the not-seated recognition mode when the load variation width detected by the load detection apparatus falls within a second threshold value which is larger than the first threshold value during a predetermined time when the fact that the seatbelt has changed from the fastened state to the non-fastened state is detected.

5 Claims, 6 Drawing Sheets

SEAT OCCUPANT DETERMINING APPARATUS

TECHNICAL FIELD

This disclosure relates to a seat passenger determination apparatus.

BACKGROUND ART

A vehicle seat of an automotive vehicle is configured to deploy an airbag in case of accident when a passenger is seated on the seat and hence a load detection apparatus configured to detect the load of the passenger is provided. The vehicle seat is also configured to determine to be "seated" indicating that the passenger is seated when the load detected by the load detection apparatus exceeds a predetermined threshold value, and determine to be "not seated" when the load is not higher than the threshold value.

An example of a passenger sensing unit configured to determine the presence or absence of the passenger by sensing a load acting on the seat is described in JP 09-207638 A (hereinafter, referred to as Reference 1). In the passenger sensing unit disclosed in Reference 1, load sensors are installed only at two front and rear positions from among four seat mounting portions, whereby the presence or absence of the passenger is determined from the sum of the obtained two load values.

According to the passenger sensing unit described above, by mounting the load sensors at two positions at the front and the rear on the left or right side of the seat mounting portion, the presence or absence of the passenger may be determined while minimizing the number of positions of installation of the load sensors, and achieving cost reduction and weight reduction of the unit.

However, in a method of installing the load sensors at two positions on the front and the rear on the left or right side of the seat mounting portion, the load value to be detected by the load sensor in association with a turning travel of the vehicle varies, and there is a risk that erroneous determination is made. For example, when the load sensors are installed at two front and rear positions inside on a passenger seat side of a vehicle having a steering wheel on the left side, the load value detected by the load sensor is reduced by a centrifugal force that acts on the seat in association with the leftward turning travel of the vehicle. Therefore, distinction of whether the load value detected by the load detection apparatus is caused by unloading of the passenger or by the turning of the vehicle becomes difficult, and depending on the behavior of the vehicle, an airbag display lamp is continuously lit even though the passenger has gotten out of the vehicle.

Therefore, a seat passenger determination apparatus configured so as not to be associated with drawbacks as described above is desired.

SUMMARY

The seat passenger determination apparatus disclosed here includes: a seatbelt fastening detector configured to detect whether a seatbelt is in a fastened state or in a non-fastened state; a load detection apparatus including two load sensors arranged on one of the left and right sides on the front and rear on the lower side of the vehicle seat and configured to detect a load acting on the vehicle seat; a state change determination unit configured to determine the fact that the seatbelt is changed from the fastened state to the non-fastened state by using the seatbelt fastening detector; a first determination processing unit configured to determine that the passenger is not seated on the vehicle seat by having gotten out of the vehicle and transfer the mode to the not-seated recognition mode when a load variation width detected by the load detection apparatus falls within a first threshold value in a state in which the non-fastened state of the seatbelt is detected by the seatbelt fastening detector in the passenger-seated recognition mode; and a second determination processing unit configured to determine that the passenger is not seated on the vehicle seat by having gotten out of the vehicle and transfer the mode to the not-seated recognition mode when the load variation width detected by the load detection apparatus falls within a second threshold value which is larger than the first threshold value during a predetermined time when the fact that the seatbelt has changed from the fastened state to the non-fastened state by the state change determination unit in the passenger-seated recognition mode.

DETAILED DESCRIPTION

Figure 1:
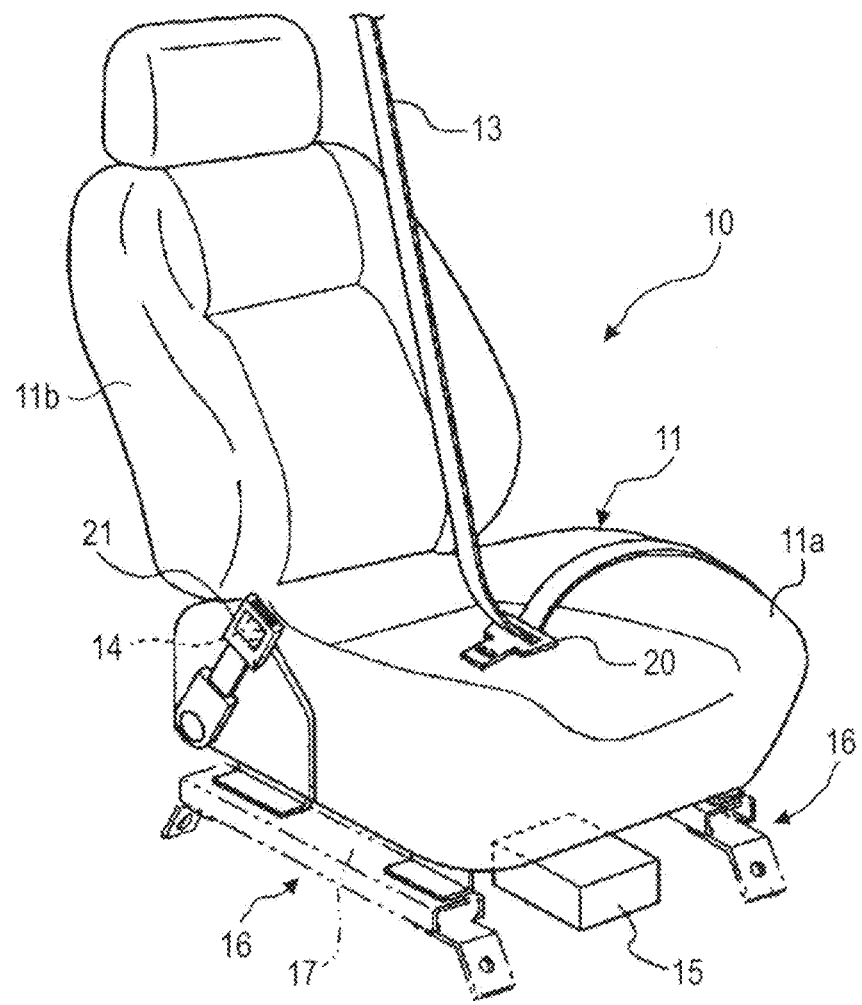
FIG. 1 is a perspective view of a vehicle seat provided with a seat passenger determination apparatus illustrating an embodiment of the invention disclosed here.

Referring now to the drawings, an embodiment disclosed here will be described below. The directions such as "fore-and-aft, left and right, up and down" used in this specification are described with reference to the respective directions of the vehicle viewed from a passenger seated on a vehicle seat 11. In this embodiment, it is assumed that the vehicle has a steering wheel on the left side, and that the presence or absence of the passenger seated on a passenger seat is determined.

As illustrated in FIG. 1, the vehicle seat 11 on the passenger seat side includes a seat cushion 11a as a seat surface where the passenger is to be seated, and a seatback 11b as a backrest mounted so as to be rotatable in the fore-and-aft direction at a rear end portion of the seat cushion 11a. The vehicle seat 11 includes a load detection apparatus 12 (see FIG. 2 and FIG. 3) configured to detect the load of the passenger seated on the seat cushion 11a or of an article, a seatbelt 13 configured to constrain the passenger seated on the vehicle seat 11 when fastened and release the same when not fastened, a buckle switch 14 configured to detect whether the seatbelt 13 is in the fastened state or not in the fastened state, and a controller 15.

Figure 2:
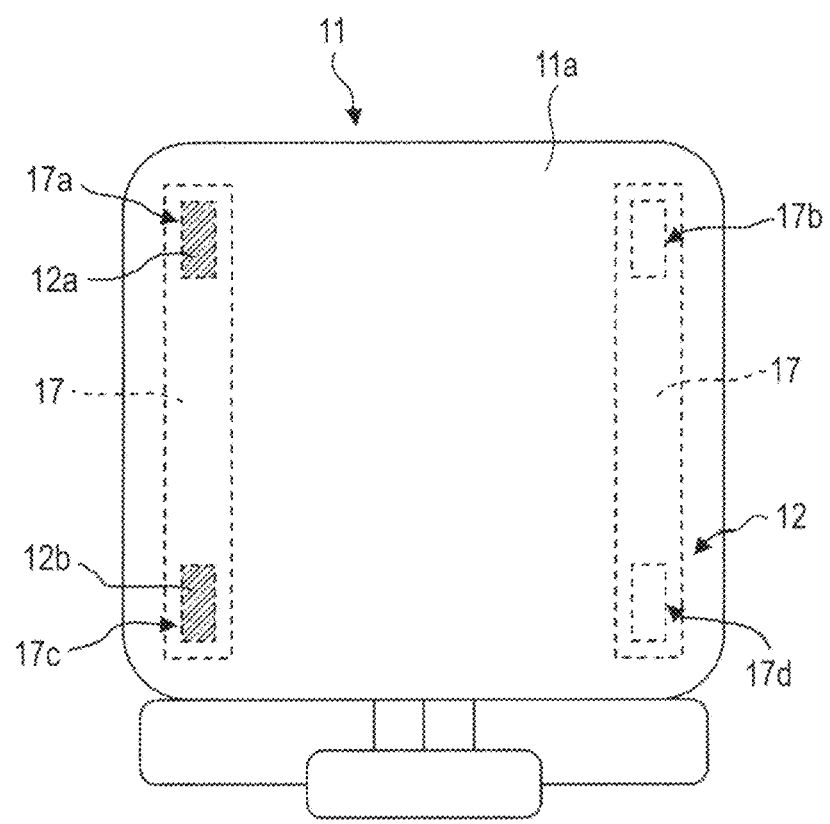
FIG. 2 is a drawing of the vehicle seat viewed from the top thereof.

The vehicle seat 11 is supported by a vehicle floor via a pair of left and right upper rails 17 of a seat sliding unit 16 which supports the vehicle seat 11 so as to be capable of adjusting the position thereof in the fore-and-aft direction of the vehicle. On the pair of left and right upper rails 17 as illustrated in FIG. 2, four supporting leg portions 17a, 17b, 17c, and 17d supporting the seat cushion 11a of the vehicle seat 11 are disposed at four corners apart from each other in the left and right direction and the fore-and-aft direction of the vehicle.

The load detection apparatus 12 includes two load sensors 12a and 12b, and the load sensors 12a and 12b are each formed of a strain gauge-type sensor having an amplifier integrated therein. The two load sensors 12a and 12b are interposed between the seat cushion 11a and the upper rails 17 at two positions at the front and rear on one side (inside) of the left and right of the four supporting leg portions 17a to 17d described above, so that the load of the passenger or the like seated on the seat cushion 11a of the vehicle seat 11 can be detected by the two load sensors 12a and 12b.

The seatbelt 13 is provided with a tongue plate 20 in the middle thereof as illustrated in FIG. 1, and a buckle 21 engageable with the tongue plate 20 is provided at a side portion of the seat cushion 11a. The buckle 21 includes a buckle switch 14 constituting a seatbelt fastening detector integrated therein, so that an ON signal indicating that the seatbelt 13 is in a fastened state is output from the buckle switch 14 when the tongue plate 20 is engaged with the buckle 21. When the tongue plate 20 is not engaged with the buckle 21, the buckle switch 14 outputs an OFF signal indicating that the seatbelt 13 is not in the fastened state.

Figure 3:
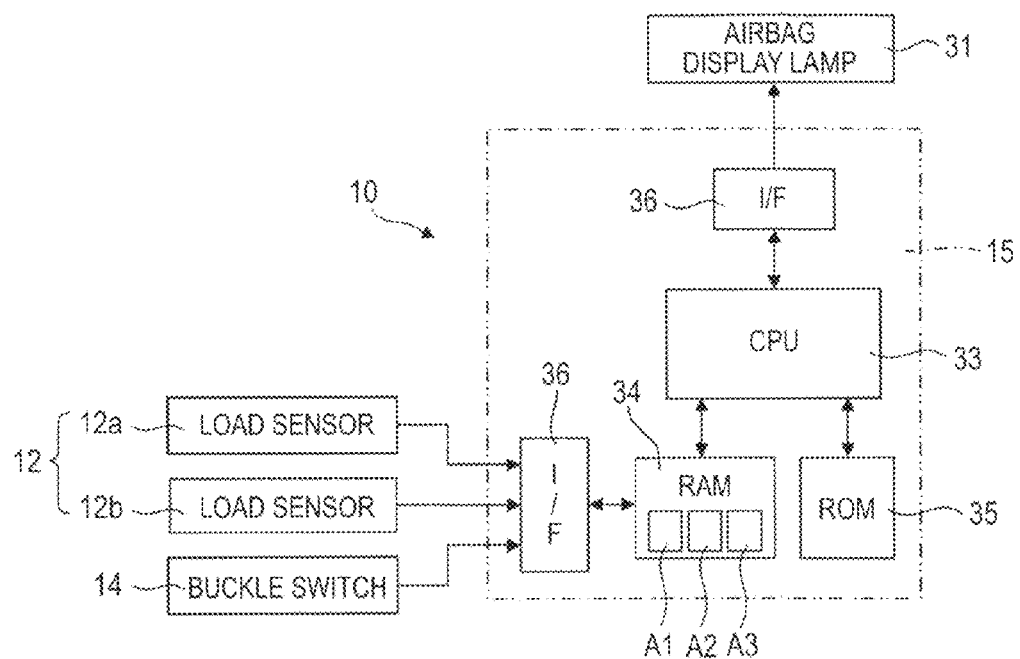
FIG. 3 is a block diagram of a seat passenger determination apparatus.

FIG. 3 is a block diagram of the seat passenger determination apparatus 10, and a controller (ECU) 15 as a control unit includes a CPU 33, a RAM 34, a ROM 35, and an interface 36, and a seat passenger determination program is stored in the ROM 35. The RAM 34 is configured to allow entry of the load signals detected by the two load sensors 12a and 12b and the ON/OFF signal from the buckle switch 14 of the seatbelt 13 and an ON/OFF signal of a door opening-and-closing sensing switch 30 configured to sense the opening and closing of the door on the passenger seat side via the interface 36. An airbag display lamp 31 indicating that an airbag, not illustrated, is in the operable state is connected to the CPU 33 via the interface 36.

The CPU 33 detects the weight of the passenger seated on the vehicle seat 11 and the weight of the article placed on the vehicle seat 11 by adding the load signals from the two load sensors 12a and 12b transmitted to the RAM 34. For example, when the passenger or the like is seated on the vehicle seat 11 in a normal posture, substantially equivalent loads are applied to the two load sensors 12a and 12b disposed at two positions at the front and rear on one of the left and right of the seat cushion 11a.

Accordingly, the weight of the passenger seated on the vehicle seat 11 and the weight of the article may be detected by adding the respective load signals detected by the two load sensors 12a and 12b by the CPU 33. The outputs from the load sensors 12a and 12b are calibrated to zero point in a state in which the vehicle is situated on a flat ground and in a vacant state in which nobody is seated or nothing is placed on the seat cushion 11a.

The RAM 34 is provided with a memory area A1 in which a "not-seated recognition mode" M1 which recognizes a no-seated state in which the passenger is not seated on the vehicle seat 11, a memory area A2 in which a "passenger-seated recognition mode" M2 which recognizes a state in which the passenger is seated, and a memory area A3 in which an "article recognition mode" M3 which recognizes a state in which the article is placed. When the "non-seated recognition mode" M1 and the "article recognition mode" M3 are memorized, the airbag display lamp 31 is turned OFF, while the "passenger-seated recognition mode" M2 is memorized, the airbag display lamp 31 is turned ON.

Figure 4:
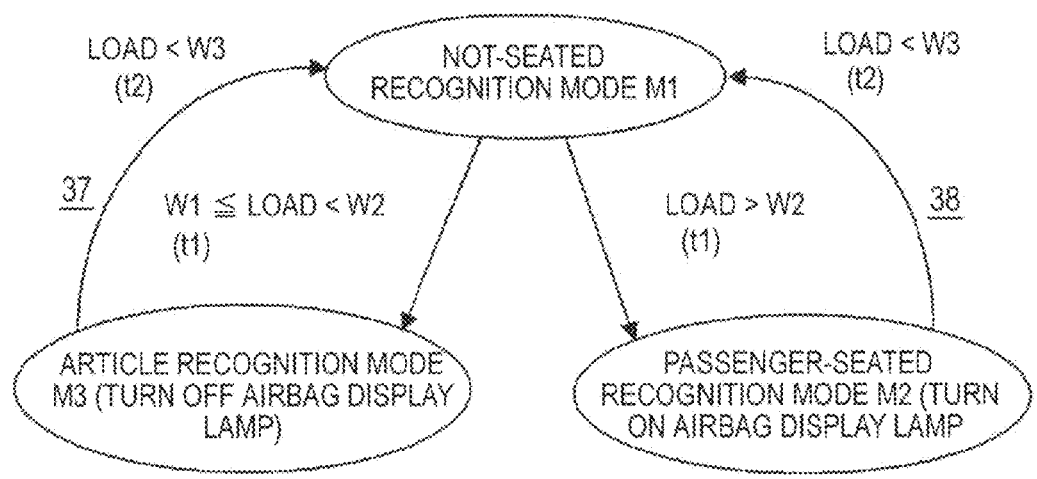
FIG. 4 is a drawing illustrating a transition state of the seat passenger determination apparatus.

The controller 15 is configured to perform a first transition process 37 and a second transition process 38 as illustrated in FIG. 4. The first transition process 37 is configured to make a transition of the mode to the "article recognition mode" M3 on the condition that the load detection apparatus 12 detects a load larger than a first load W1 and smaller than a second load W2 continuously for a preset time t1 in the "not-seated recognition mode" M1, and to the "not-seated recognition mode" M1 on the condition that the load detection apparatus 12 detects a load smaller than a third load W3 slightly smaller than the first load W1 continuously for a preset time t2 in the "article recognition mode" M3.

The second transition process 38 is configured to make a transition of the mode to the "passenger-seated recognition mode" M2 on the condition that the load detection apparatus 12 detects the load larger than the second load W2 continuously for the preset time t1 in the "not-seated recognition mode" M1, and to the "not-seated recognition mode" M1 on the condition that the load detection apparatus 12 detects the load smaller than the third load W3 continuously for the preset time t2 in the "passenger-seated recognition mode" M2.

In this embodiment, the grounds that the reference of determination of the "passenger-seated recognition mode" M2 is determined to be a case where the load not lower than the second load W2 is detected by the load detection apparatus 12 are that the load detection apparatus 12 is configured to be capable of sensing the fact that the passenger is seated even when children from 6 years of old required to fasten the seatbelt 13 or relatively undersized adult women are lightly seated on the front portion of the seat cushion 11a.

Incidentally, in the embodiment disclosed here, since the load sensors 12a and 12b which constitute the load detection apparatus 12 are arranged only on the front and rear on one side (inner side) of the vehicle seat 11, the load value detected by the load detection apparatus 12 varies depending not only on whether the passenger is seated on the vehicle seat 11 or has moved apart from the vehicle seat 11 for getting out as a matter of course, but also on whether the vehicle turns leftward or rightward during traveling.

In other words, when the vehicle travels so as to turn leftward, the vehicle seat 11 on the passenger side (the right side of the vehicle) and the passenger seated thereon are leaned rightward by a centrifugal force, so that an output from the load detection apparatus 12 becomes smaller. In contrast, when the vehicle travels so as to turn rightward, an output from the load detection apparatus 12 becomes larger.

IN this case, if the passenger seated on the vehicle seat 11 fastens the seatbelt 13, the "passenger-seated recognition mode" M2 may be fixed irrespective of the reduction of the load detected by the load detection apparatus 12 and transition to the "not-seated recognition mode" M1 does not occur. However, in the non-fastened state of the seatbelt 13, the mode cannot be determined to be the "not-seated recognition mode" M1 even though the output of the load detection apparatus 12 is reduced to a value smaller than the threshold value, and whether the reduction of the load is caused by the leftward turning travel or by unloading of the passenger needs to be determined.

Whether the reduction of the load is caused by the turning travel or by the fact that the passenger has gotten out may be determined by reviewing a variation width of the load. For example, during the leftward turning travel, the output from the load detection apparatus 12 is reduced significantly. However, the output from the load detection apparatus 12 is not stabilized. It is because maintenance of the steering angle or vehicle speed constantly during turning traveling is difficult and, in addition, the load is varied due to the irregularity of the road surface.

In contrast, when the passenger seated on the passenger seat has gotten out of the vehicle, since the vehicle is stopped as a matter of course, not only the output from the load detection apparatus 12 is significantly reduced, but also the output from the load detection apparatus 12 is stabilized.

According to an experiment conducted by the inventors, it is understood that whether the passenger has gotten out or the vehicle has turned is distinguished by setting a threshold value α of a load variation width (for example, on the order of ±0.2 kg) and checking whether the output from the load detection apparatus 12 falls within the load variation width α or not. In other words, when the variation width of the load within the threshold value α continues for a predetermined time, it is determined that the passenger has gotten out, and when the variation width of the load is out of the threshold value α, it may be determined to be the vehicle turning. A load variation caused by the influence of an electric noise or the load variation caused by the influence of idling variations occurs even while the vehicle is stopped, the load variation width is set so as to allow these variations.

The probability that the passenger gets out of the vehicle is high and in contrast, the possibility that the vehicle turns is low for a predetermined time tz (for example, several tens of seconds) after the state of the passenger has changed from a state of fastening the seatbelt 13 to a state of not fastening the seatbelt 13. Therefore, it is effective to set a wide load stable width for the period of the predetermined time tz after the seatbelt 13 has changed from the fastened state to the non-fastened state in order to ensure accurate determination of the fact that the passenger has gotten out of the vehicle.

In other words, even though the vehicle seat 11 vibrates due to the closing of the door at the time of getting out of the vehicle or by the contact of the passenger with respect to the vehicle seat 11 at the time of getting out of the vehicle, the fact that the passenger has gotten out of the vehicle may be determined in an early stage by setting a wide load variation width that permits the vibration of such magnitude. Accordingly, the transfer from the "passenger-seated recognition mode" M2 to the "not-seated recognition mode" M1 is achieved with a high degree of accuracy in a short time.

Figure 5:
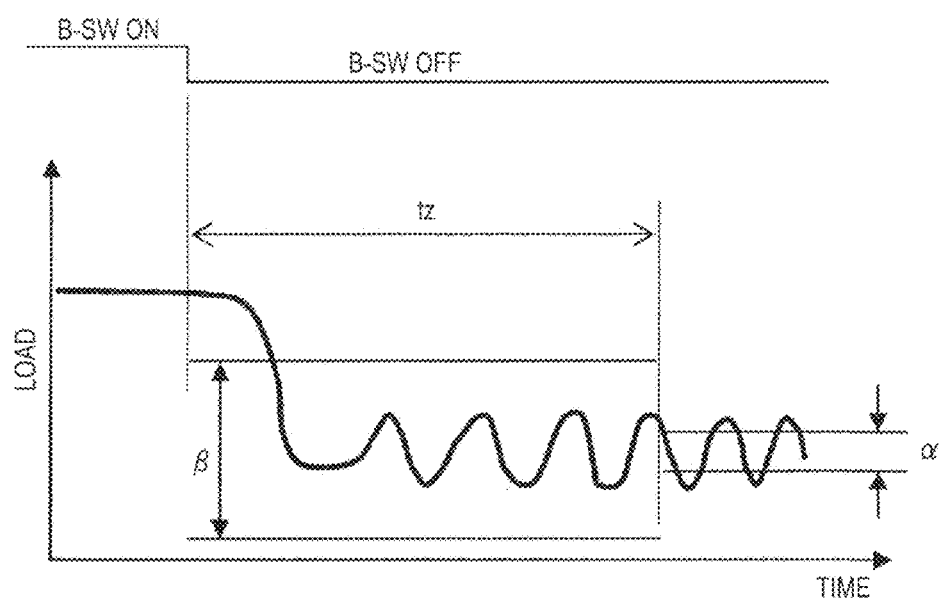
FIG. 5 is a graph illustrating experimental data of a load variation.
Figure 6:
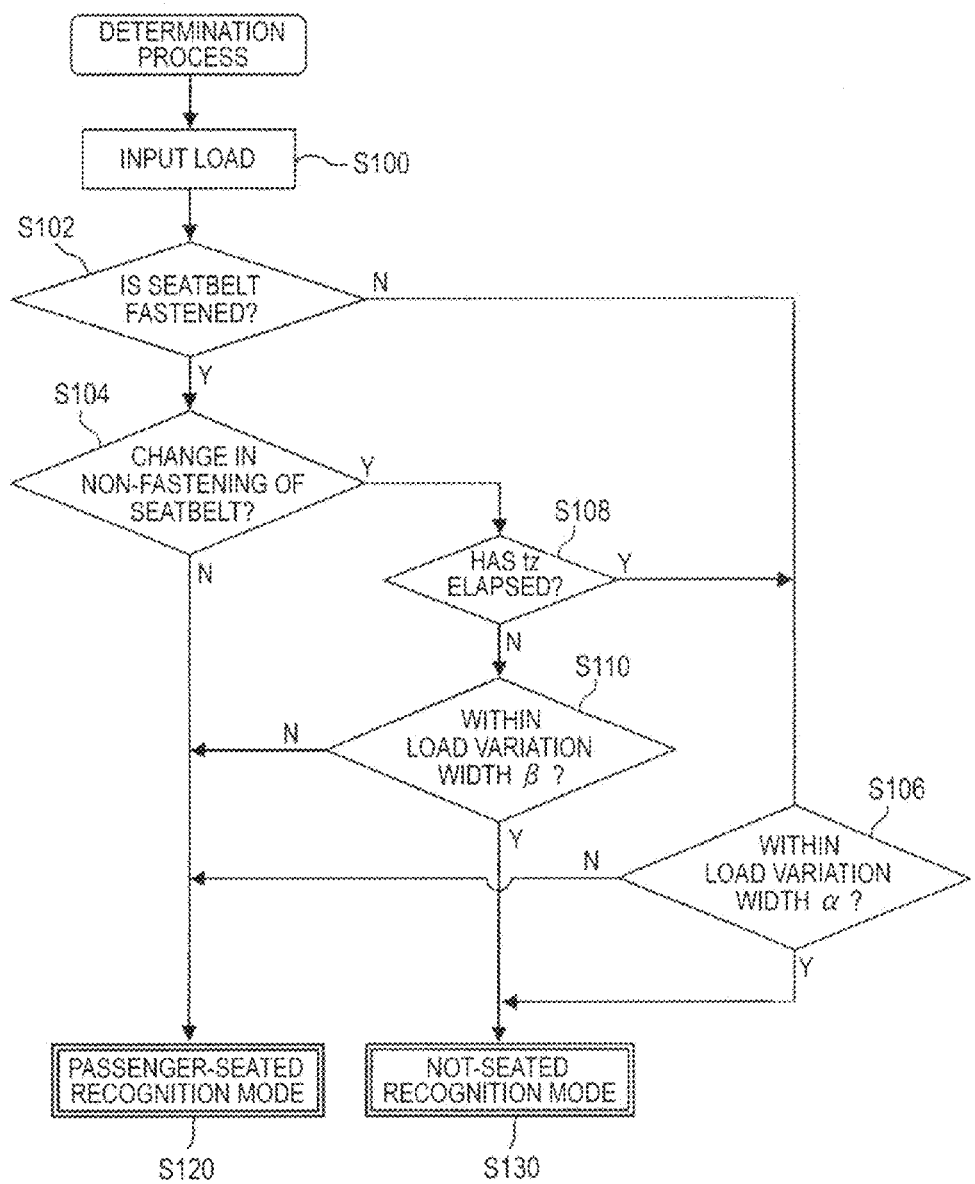
FIG. 6 is a drawing illustrating a flowchart of the seat passenger determination apparatus.

FIG. 5 and FIG. 6 illustrate a graph and a flowchart used for a determination process for determining the fact that the passenger has gotten out of the vehicle or the vehicle has turned. Basically, whether the reduction of the load is caused by the passenger having gotten out of the vehicle or by the turning travel is determined depending on whether or not load values sensed by the load sensors 12a and 12b are reduced to a certain range and the load values are stable within the predetermined variation width.

FIG. 5 illustrates a load variation width for determining whether the passenger has gotten out of the vehicle or the vehicle has turned. In other words, the passenger normally fastens the seatbelt 13 and brings the seatbelt 13 into the non-fastened state when getting out of the vehicle. Therefore, immediately after the seatbelt 13 has changed from the fastened state to the non-fastened state (the buckle switch 14 has changed from ON to OFF), it can be said that the passenger is highly likely to get out of the vehicle. Therefore, for the fixed time tz after the seatbelt 13 has changed to the non-fastened state, the determination of the fact that the passenger has gotten out of the vehicle is made on the basis of a wider load variation width (second threshold value) β rather than a normal narrower load variation width (first threshold value) α, and from then onward and in other cases, whether the vehicle has turned or the passenger has gotten out of the vehicle is determined by the normal narrower load variation width α.

Here, the wider load variation width β is suitably set to 5 to 10 times the narrower load variation width α.

By increasing the load variation width, even though the vehicle seat 11 vibrates due to the closing of the door at the time of getting out of the vehicle or by the contact of the passenger with respect to the vehicle seat 11 at the time of getting out of the vehicle and hence a load variation exceeding the load variation width α occurs, the fact that the passenger has gotten out of the vehicle can be determined in an early stage and at a high degree of accuracy. Accordingly, doubt of the driver about a breakdown of the apparatus, due to the airbag display lamp 31 being continuously lit though the passenger has gotten out of the vehicle, may be swept away.

FIG. 6 illustrates a flowchart of a determination process processed by the controller 15, and this flowchart is repeatedly executed every predetermined time.

First of all, a load value detected by the load detection apparatus 12 is input in Step S100, and whether or not the seatbelt 13 is in the fastened state is determined in a subsequent Step S102. When the result of determination in Step S102 is Y (YES), that is, when the seatbelt 13 is in the fastened state, the procedure goes to Step S104, and when it is N (NO), that is, when the seatbelt 13 is in the non-fastened state, the procedure goes to Step S106.

In Step 104, whether or not the seatbelt 13 is changed from the fastened state to the non-fastened state (the buckle switch 14 is changed from ON to OFF) is determined and, when it is N, it is determined that the passenger is seated on the vehicle seat 11, and it is determined to be the "passenger-seated recognition mode" M2 in Step S108, which is memorized in the RAM 34 of the controller 15. Accordingly, the airbag display lamp 31 is turned ON.

In contrast, when the result of determination in Step S102 is N, whether or not the load variation is stable within the predetermined first load variation width α is determined in Step S106. Here, the first load variation width α is smaller than the load variation width caused by the turning travel, and hence is set to a value larger than the load variation width caused by a vibration of an engine (for example, 1 kg or smaller). When the result of determination in Step S106 is Y, it is determined that the passenger has gotten out of the vehicle and to be in the "not-seated recognition mode" M1 in Step S130, which is stored in the RAM 34 of the controller 15. Accordingly, the airbag display lamp 31 is turned OFF.

When the result of determination in Step S104 is Y, whether or not the fixed time tz is elapsed from the change of the seatbelt 13 to the non-fastened state is determined subsequently in Step S108. When the time tz is not elapsed (within the time tz), whether or not the load variation is stable within the predetermined second load variation width β is determined subsequently in Step S110. The second load variation width β here is a value sufficiently larger than the first load variation width α described above (for example, on the order of 5 to 10 times).

The reason is for ensuring an adequate determination of the fact that the passenger has gotten out of the vehicle even when the load variation is caused by disturbance or the like by increasing the range of the load stability (from the first load variation width α to the second load variation width β) because the probability that the passenger gets out of the vehicle is high immediately after the seatbelt 13 has changed from the fastened state to the non-fastened state.

In Step S108, when it is determined that the time tz has elapsed, the procedure goes to Step S106 described above, where whether or not the load variation is stable within the first load variation width α is determined. When it is determined to be stable within the first load variation width α, it is determined that the passenger has gotten out of the vehicle and the transition is made to the determination state of the "not-seated recognition mode" M1. In contrast, when it is determined that the load is not stable, it is determined to be an influence of the turning travel, and the determination state of the "passenger-seated recognition mode M2" is maintained. In the same manner, when the result of determination of Step S110 is N, it is determined to be an influence of the turning travel, and the determination state of the "passenger-seated recognition mode M2" is maintained.

Steps S102 and S104 described above constitute a state change determination unit configured to determine the fact that the seatbelt 13 is changed from the fastened state to the non-fastened state. Step S106 described above constitutes a first determination processing unit configured to transfer the mode to the "not-seated recognition mode" M1 when the load variation width falls within the first threshold value α, and Step S110 described above constitutes a second determination processing unit configured to transfer the mode to the "not-seated recognition mode" M1 when the load variation width falls within the second threshold value β.

According to the embodiment described above, there are provided a seatbelt fastening detector (buckle switch 14) configured to detect whether a seatbelt 13 is in a fastened state or in a non-fastened state; a load detection apparatus 12 including the two load sensors 12a and 12b arranged on one of the left and right sides on the front and rear on the lower side of a vehicle seat 11 and configured to detect a load acting on the vehicle seat 11; a state change determination unit (S102, S104) configured to determine the fact that the seatbelt 13 is changed from the fastened state to the non-fastened state by using the seatbelt fastening detector 14; a first determination processing unit (S106) configured to determine that a passenger is not seated on the vehicle seat 11 by having gotten out of the vehicle when a load variation width detected by the load detection apparatus 12 falls within a first threshold value α in a state in which the non-fastened state of the seatbelt 13 is detected by the seatbelt fastening detector 14 in a "passenger-seated recognition mode" M2; a second determination processing unit (S110) configured to determine that the passenger is not seated on the vehicle seat 11 by having gotten out of the vehicle and transfer the mode to the "not-seated recognition mode" M1 when the load variation width detected by the load detection apparatus 12 falls within the second threshold value β which is larger than the first threshold value during a predetermined time when the fact that the seatbelt 13 has changed from the fastened state to the non-fastened state is detected by the state change determination unit (S102, S104) in the "passenger-seated recognition mode" M2.

Accordingly, immediately after the determination of the fact that the seatbelt 13 has changed from the fastened state to the non-fastened state, the fact that the passenger has gotten out of the vehicle may be determined adequately, so that the transfer from the "passenger-seated recognition mode" M2 to the "not-seated recognition mode" M1 may be performed with high degree of accuracy. In other words, since it is highly likely that the passenger gets out of the vehicle within a certain period when the seatbelt 13 is changed from the fastened state to the non-fastened state, the fact that the passenger has gotten out of the vehicle may be determined in an early stage even though the load variation is caused by disturbance by increasing the variation width of the load for determining that the passenger has gotten out of the vehicle, so that the airbag display lamp 31 may be avoided from continuously lit even though the passenger has gotten out of the vehicle.

According to the embodiment described above, the determination is performed by the second determination processing unit (S110) during the predetermined time after the seatbelt 13 has changed from the fastened state to the non-fastened state and, after the predetermined time has elapsed, the determination is performed by the first determination processing unit (106). Therefore, the fact that the passenger has gotten out of the vehicle may be determined adequately without missing the fact that the passenger has gotten out of the vehicle during the predetermined time after the seatbelt 13 has changed from the fastened state to the non-fastened state, and a confusion with the load variation due to the turning of the vehicle may be avoided by reducing the load variation width after having elapsed the predetermined time.

In the embodiment described above, the example in which the two load sensors 12a and 12b are arranged at the front and rear on the inside (left side) of the passenger seat of the vehicle having the steering wheel on the left side has been described. However, the two load sensors 12a and 12b may be arranged at the front and rear on the inside (right side) of a passenger seat of a vehicle having a steering wheel on the right side and, in this case, the load value detected by the load detection apparatus 12 is reduced by the rightward turning travel of the vehicle. The two load sensors 12a and 12b may be arranged at the front and rear on the outside (on the window side) of the passenger seat.

Although the invention has been described with reference to the embodiment, the invention is not limited to the configuration described in the embodiment and various modes may be employed within a range described in Claims.

The invention claimed is:

1. A seat passenger determination apparatus configured to determine whether a mode is a passenger-seated recognition mode in which a passenger is seated on a vehicle seat, or a not-seated recognition mode in which no passenger is seated on the vehicle seat, comprising:

a seatbelt fastening detector configured to detect whether a seatbelt is in a fastened state or in a non-fastened state;

a load detection apparatus including two load sensors arranged on one of a left side and a right side on a front and a rear on a lower side of the vehicle seat and configured to detect a load acting on the vehicle seat;

a state change determination unit configured to determine a fact that the seatbelt is changed from the fastened state to the non-fastened state by using the seatbelt fastening detector;

a first determination processing unit configured to determine a first determination that the passenger is not seated on the vehicle seat by having gotten out of the vehicle and transfer the mode to the not-seated recognition mode when a variation width of the load detected by the load detection apparatus in a state in which the non-fastened state of the seatbelt is detected by the seatbelt fastening detector in the passenger-seated recognition mode falls within a first threshold value of load variation width; and a second determination processing unit configured to determine a second determination that the passenger is not seated on the vehicle seat by having gotten out of the vehicle and transfer the mode to the not-seated recognition mode when the load variation width of the load detected by the load detection apparatus during a predetermined time immediately after the seatbelt has changed from the fastened state to the non-fastened state as determined by the state change determination unit in the passenger-seated recognition mode falls within a second threshold value of load variation width which is larger than the first threshold value of load variation width, wherein a third determination that the passenger is not seated on the vehicle seat by having gotten out of the vehicle is performed by the first determination processing unit when the variation width of the load detected by the load detection apparatus is within the first threshold value of load variation width after the predetermined time has elapsed.

2. The seat passenger determination apparatus according to claim 1, wherein the two load sensors are each strain gauge sensors.

3. The seat passenger determination apparatus according to claim 1, wherein the first threshold value of load variation width is an inclusive range between ±X where X is a first predetermined load value, and wherein the second threshold value of load variation width is an inclusive range between ±Y where Y is a second predetermined load value.

4. The seat passenger determination apparatus according to claim 3, wherein Y is five to 10 times larger than X.

5. The seat passenger determination apparatus according to claim 1, wherein the second threshold value of load variation width is five to 10 times larger than the first threshold value of load variation width.

* * * * *